Sept. 9, 1969　　　A. J. ADEY ETAL　　　3,465,679
LIQUID PUMPING APPARATUS
Filed Sept. 28, 1967　　　　　　　　　　3 Sheets-Sheet 1

INVENTOR
Anthony John Adey et al
By
Attorneys

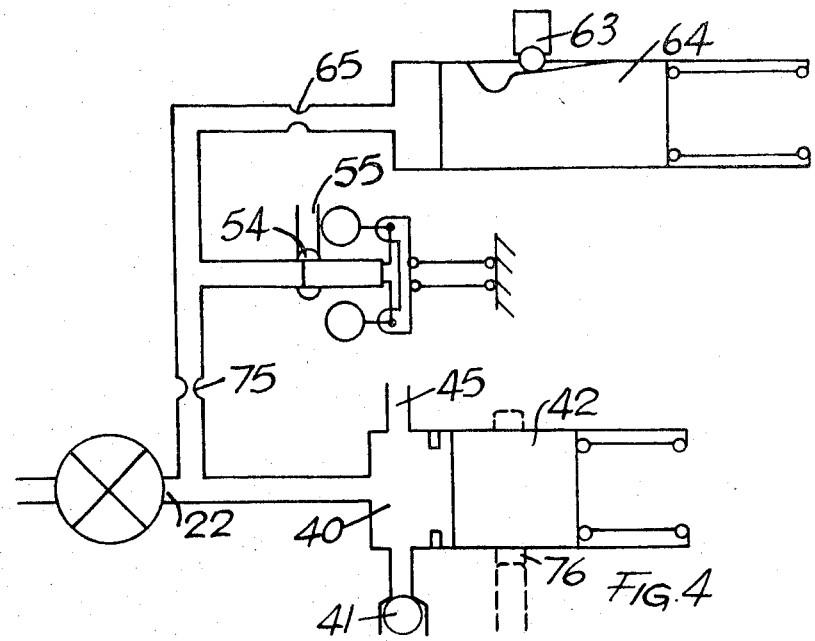
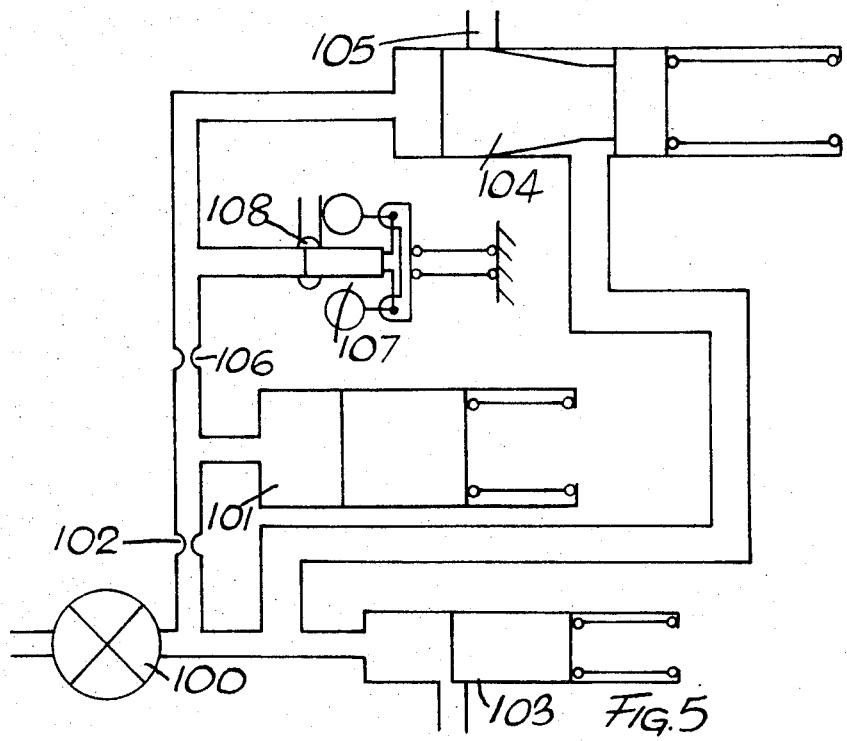

United States Patent Office 3,465,679
Patented Sept. 9, 1969

3,465,679
LIQUID PUMPING APPARATUS
Anthony John Adey, Ruislip, and Paul Edgar Glikin, Hendon Way, London, England, assignors to C.A.V. Limited, London, England
Filed Sept. 28, 1967, Ser. No. 671,278
Int. Cl. F04b 23/04, 11/00
U.S. Cl. 103—5            6 Claims

ABSTRACT OF THE DISCLOSURE

A liquid fuel pumping apparatus of the kind including a pressure pump to which fuel is supplied intermittently from a feed pump, the feed pump outlet being in communication with a variable capacity reservoir, the apparatus also including a centrifugal regulator including a variable orifice, and a pressure responsive piston which effects a control over the pressure pump, the pressure responsive piston together with the centrifugal regulator being in communication with the outlet of the feed pump by way of a restrictor whereby fluctuations in the output pressure of the feed pump due to the intermittent flow to the pressure pump are smoothed before application to the pressure responsive piston.

---

This invention relates to liquid fuel umping apparatus of the kind comprising a pressure pump from which liquid fuel is expelled during an injection stroke and to which liquid fuel is supplied during a filling stroke, a feed pump for supplying fuel to the pressure pump, a centrifugal regulator controlling the outut pressure of the feed pump and a piston responsive to the output pressure of the feed pump for effecting a control over the pressure pump.

With such an apparatus the intermittent filling of the pressure pump causes fluctuations in the output pressure of the feed pump and these in turn influence the piston. The output pressure of the feed pump varies in accordance with the speed at which it is driven and the total variation in pressure is comparatively small when compared with the fluctuations which occur due to the filling of the pressure pump. Attempts in the past to reduce the sensitivity of the piston to the fluctuations in pressure have resulted only in the reduction in the sensitivity of the piston to the variation in pressure due to changes in the speed.

The object of the invention is to provide such an apparatus in a simple and convenient form in which the difficulties outlined above are minimised.

According to the invention an apparatus of the kind specified includes hydraulic damping means comprising a variable capacity reservoir operative to reduce the magnitude of the fluctuations in the pressure applied to the piston.

Figure 1:
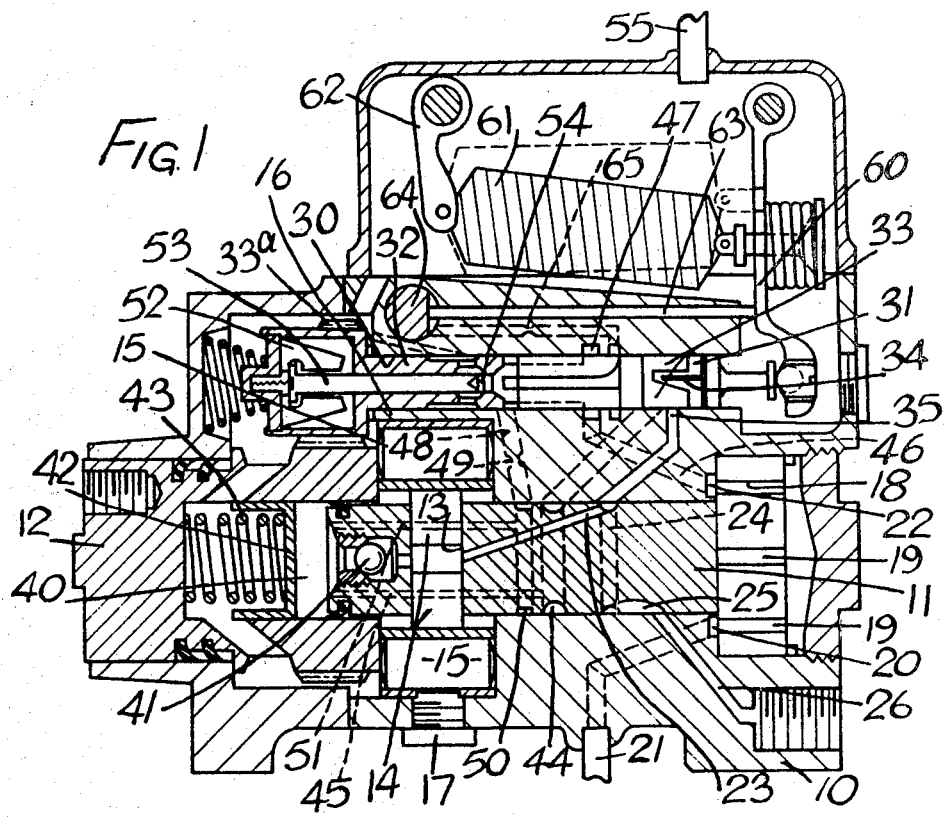

In the accompanying drawings:
FIGURE 1 is a sectional side elevation of one example of a liquid fuel pumping apparatus in accordance with the invention and for supplying fuel to an internal combustion engine,
FIGURE 2 shows in diagrammatic form the fuel circuit of the apparatus of FIGURE 1,
FIGURES 3 and 4 show modified fuel circuits for an apparatus of the kind shown in FIGURE 1 and
FIGURE 5 shows a fuel circuit of a modified form of the apparatus.

Figure 2:
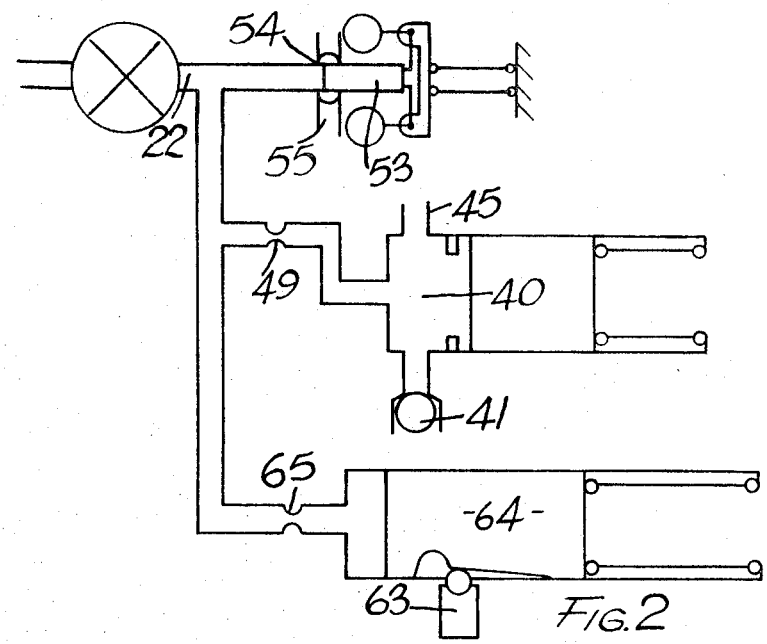
Figure 3:
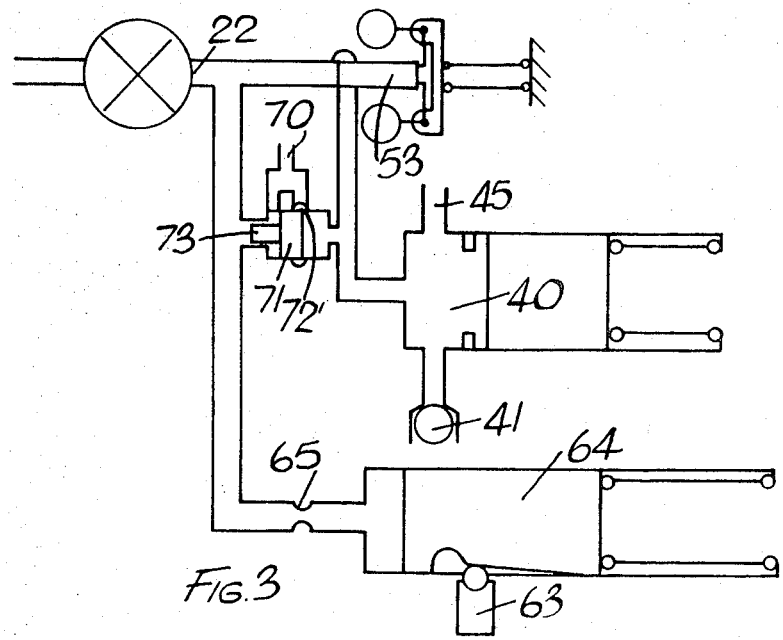

With reference to FIGURES 1 and 2 there is provided a body part 10 in which is mounted a rotary cylindrical distributing member 11. The distributing member is adapted to be driven by the engine with which the apparatus is associated and for this purpose an input shaft 12 is provided and which is journalled in the body part. Formed in the distributing member is a transverse bore 13 in which is mounted a pair of pumping plungers 14. The pumping plungers are arranged to be moved inwardly as the distributing member rotates, by the inter-action of rollers 15 disposed at the outer ends of the plungers respectively, with a plurality of pairs of inwardly extending cam lobes formed on the internal periphery of an annular cam ring 16 which surrounds the distributing member at this point. The cam ring 16 is fixed with the body part by a screw 17.

The pumping plungers 14 together with the bore 13 in which they are mounted define a pressure pump which is more commonly referred to in the art as an injection pump. In the body part at the opposite end of the distributor member to the bore 13 there is defined an annular chamber 18, the axis of which is eccentric relative to the axis of rotation of the distributing member and mounted on the latter are radially slidable blades 19 which co-operate with the peripheral surface of the annular chamber to define a vane-type feed pump. The feed pump is provided with an inlet port 20 which is in communication with a fuel inlet 21 disposed within the body part and which in use, is connected to a source of liquid fuel. The feed pump is also provided with an outlet 22.

Within the distributing member is formed a passage 23 and at one end, this passage is communication with the bore 13. At its other end the passage is in communication with a circumferential groove 24 from which extends a single delivery groove 25 which as the distributing member rotates, registers in turn with a plurality of delivery ports 26 only one of which is shown, formed in the body part. These ports in use are connected to the injection nozzles respectively of the associated engine and the communication between the delivery groove 25 and one of the delivery ports 26 occurs only during the time when the plungers are moved inwardly by the action of the cam lobes.

Also formed in the body part is a cylindrical bore 30 in which at one end, is mounted a rotary cylindrical spill valve 31 which is driven at a higher speed than the distributing member by means of a shaft 32 at one end of which is formed a pinion 33 which meshes with teeth formed on the drive shaft 12. The spill valve 31 is driven from the shaft 32 by means of a tongue and groove connection so that the axial setting of the valve can be adjusted whilst it is being rotated. In the particular example the shaft is driven at twice the speed of the distributing member and formed on the periphery of the spill valve are a pair of angularly spaced grooves 33. These grooves define between them a pair of diametrically opposed lands 34 only one of which is seen, which are capable of covering and uncovering a spill port 35 which is formed in the wall of the bore which contains the spill valve. The spill port 35 is in constant communication with the circumferential groove 24 through a passage formed in the body part. The setting of the spill valve relative to the distributing member is such that during at least part of the time when the pumping plungers are being moved inwardly one of the lands 34 will cover the spill port 35 and when this occurs fuel from the pumping space defined between the pumping plungers will pass to the appropriate outlet port. When the spill port is exposed to the grooves 33 and during inward movement of the plungers 14 delivery valves not shown which are mounted in the outlet ports respectively, close and the fuel from the pumping chamber is then spilt through the spill port 35. In order to be able to vary the quantity of fuel which is delivered to the engine the circumferential length of the lands 34 varies along the axial length thereof. Thus by varying the axial setting of the spill valve so the time during which the spill port is covered during a pumping stroke of the injection pump can be varied and in this manner the quantity of fuel which is delivered to the engine will be varied. In the present example one of the edges of the lands is inclined to the axis of the spill valve and this means that the timing of commencement of the injection or the timing of the end of injection will vary with the quantity of fuel which is being supplied, if both edges of the lands are inclined both the beginning and ending of injection will vary in accordance with the quantity of fuel supplied.

Formed within the input shaft is a chamber, hereinafter called the reservoir 40, which is in communication with the pumping chamber of the injection pump by way of a non-return valve 41. This valve prevents the flow of fuel from the pumping chamber of the injection pump to the reservoir. At the end of the reservoir remote from the injection pump there is provided a piston 42 which is loaded by means of coiled compression spring 43 in a direction to reduced the volume of the reservoir. The reservoir is in communication through a passage 45 with a circumferential groove 44 formed on the periphery of the distributor and this groove is in communication with the grooves 33 of the rotary spill valve. In this manner the fuel which is spilt from the injection pump is delivered to the reservoir and is stored therein.

Fuel is delivered to a space defined intermediate the spill valve and the shaft 32 from the outlet 22 of the feed pump by way of a passage 46, a groove 47 formed about the bore 30, and the fluted portion of the spill valve. From this space extends a passage 48 containing a fixed restrictor 49 which is in constant communication with a circumferential groove 50 formed on the periphery of the distributor. This groove is in communication with the reservoir 40 by way of a further passage 51. For controlling the output pressure of the feed pump a centrifugally operable regulator is provided and which includes a variable orifice 54 through which fuel flows from the outlet of the feed pump to a drain 55. The regulator is mounted within the shaft 32 which drives the rotary spill valve and includes a number of fly-weights 52 which act on an axially movable control rod 53 of the regulator in a direction to close the orifice, and the outlet pressure of the feed pump acts in the opposite direction on the control rod to effect opening of the orifice. In this manner the output pressure of the feed pump varies as a function of the speed at which the distributing member is rotated.

At the end of an injection stroke of the injection pump and when the plungers are permitted to move outwardly by the cam lobes the valve 41 intermediate the pumping space and the reservoir opens and the pumping space of the injection pump is filled with fuel.

In this way the mean value of the fuel pressure within the reservoir is controlled by the output pressure of the feed pump through the restrictor and by the mean fuel flow rate through the restrictor which is approximately the mean rate of fuel delivery to the engine.

For controlling the axial setting of the spill valve a lever 60 is pivotally mounted in the body part and one end of the lever bears against the end of the spill valve 31 remote from its driving shaft. Moreover, connected to the lever intermediate its pivot point and the spill valve is a coiled tension spring the other end of which is connected to an adjustable member 62 provided to enable the force applied by the spring to the lever to be varied. The spill valve is moved axially against the action of the spring 61 by the pressure of fuel which acts on its remote end and as already stated this pressure is controlled by the centrifugal regulator. The arrangement is such that as the speed of the engine increases the spill valve will be moved axially in a direction to reduce the amount of fuel which is supplied to the engine. In order to control the maximum quantity of fuel which can be supplied to the engine at any given speed an adjustable stop is provided for the lever, the stop being in the form of a rod 63 which is movably mounted within the body part. One end of the rod is contacted by the lever and the other end of the rod bears against a cam surface formed on a fluid pressure operable piston 64 mounted within the body part. The piston is movable against the action of a spring by fuel under pressure which is derived from the outlet of the feed pump and the arrangement is such that as the speed of the engine increases so the rod is moved to reduce the maximum quantity of fuel which can be supplied to the engine. A further restrictor 65 is provided intermediate the outlet of the feed pump and the cylinder containing this piston to prevent instability.

By this arrangement the rapid fluctuations in pressure which occur as a result of intermittent fuel flow to and from the injection pump are isolated by the action of the reservoir and the restriction 49 from the spill valve 31 and the piston 64. The reservoir constitutes an hydraulic damping means.

In an alternative arrangement shown in FIGURE 3 the fuel leaving the centrifugal regulator passes directly to the reservoir, instead of to a drain, and the connection between the outlet of the feed pump and the reservoir through the restrictor 49 is omitted. Fuel is spilled from the reservoir 40 to a drain 70 by way of a further variable orifice which forms part of a pressure proportioning valve. In the particular example the pressure proportioning valve incorporates a plate valve member 71 which in conjunction with an aperture forms the further variable orifice 72, and a smaller diameter plunger 73 movable in a smaller cylinder is arranged to bear upon the plate valve to close the orifice. The plate valve member 71 is exposed to the pressure within the reservoir and the smaller diameter plunger is exposed to the output pressure of the feed pump. In this manner the fuel pressure within the reservoir is controlled to a specified proportion of the output pressure of the feed pump and any surplus fuel in the reservoir is passed through the variable orifice to the drain.

In addition a by-pass valve may be included to pass fuel from the outlet of the feed pump to the reservoir while the engine is being started and when the orifice of the centrifugal regulator may be shut.

In a further arrangement, shown in FIGURE 4 the outlet 22 of the feed pump is in direct communication with the reservoir 40 and the centrifugal regulator passes fuel to drain as in the first example, so as to control the pressure acting on the spill valve, and this fuel is supplied from the outlet of the feed pump by way of a fixed restrictor 75. Furthermore, as is shown in dotted outlines, the spring loaded piston 42 which forms part of the reservoir is arranged to uncover, after it has moved a predetermined extent against the action of its spring, a port 76 to a drain. In this manner the maximum volume of fuel which is contained within the reservoir, and the pressure thereof, is controlled.

Various additions can be made to the apparatus without affecting its mode of operation for instance, a device for stopping the associated engine may be provided and this may take the form of a valve which can be opened to connect the pumping space between the plungers to the drain, and which prevents, when it is opened, the build-up of pressure within the distributor. This valve may be the non-return valve 41 between the pumping space and the reservoir which is lifted from its seating by a manually operated mechanical device.

To aid the starting of the engine, an additional amount of fuel may be required and this can be provided by an overtravel of the piston 64 which controls the setting of the stop to a position where its cam and rod permit the spill valve to move over so that the spill port 35 is always covered. A manually operated mechanical latch may be coupled to this piston to prevent the excess fuel until the latch is operated.

This arrangement is shown in each of FIGURES 2, 3 and 4 where the cam face on the piston 64 is provided with a recess into which the rod 63 can enter to allow the spill valve to assume the position described. In addition as shown in FIGURE 1, the communication between the outlet 22 of the feed pump and the cylinder containing the piston 64 is controlled by the spill valve 31. When the latter is at the excess fuel position the aforesaid communication is broken with the result that until the spill valve is moved axially by increasing pressure from the feed pump excess fuel will be supplied.

The invention has so far been described as applied to pumping apparatus incorporating a centrifugal pressure regulator for the feed pump and at least one piston the setting of which is controlled by this pressure. Furthermore, the described apparatus utilizes a spill type fuel quantity control system. The aforesaid piston can be considered as the piston 64 but it may also be regarded as the spill valve which is also responsive to the feed pump outlet pressure. It is equally applicable to apparatus in which the quantity control comprises an adjustable throttle valve. In this case the piston can be regarded as the piston which is provided to control the angular setting of the annular cam so that control of the timing of injection of fuel can be effected. In cases where the throttle valve is movable by the output pressure of the feed pump and therefore constitutes part of an hydraulic governor the throttle valve itself can be regarded as the piston.

The fuel circuits of FIGURES 2, 3 and 4 are easily modified when a throttle valve is provided by blocking the passage 45 to the reservoir 40. In addition the valve 41 is omitted and the passage containing this valve is redirected so that the flow of fuel therethrough is controlled by a throttle member mounted in the body part. In addition the communication of this passage with the bore containing the plungers 14 is controlled by porting in the distributor and body part so that the flow of fuel can occur only when the plungers are allowed to move outwardly after an injection stroke. The arrangement shown in FIGURE 5 illustrates one form of an apparatus incorporating a throttle valve. In FIGURE 5 the feed pump is indicated at 100 having its output connected to a reservoir 101 by way of a restriction 102. A spring loaded relief valve 103 is provided for controlling the output pressure of the feed pump and fuel from the feed pump is passed by way of an axially movable spring loaded throttle valve 104 to the injection pump through a passage 105. Fuel under pressure is applied to the end of the throttle valve 104 by way of a restrictor 106 and this pressure is controlled by a centrifugal regulator incorporating a variable orifice 108.

Having thus described our invention what we claim as new and desire to secure by Letters Patent is:

1. A liquid fuel pumping apparatus of the kind comprising a pressure pump from which liquid fuel is expelled during an injection stroke and to which liquid fuel is supplied during a filling stroke, a feed pump for supplying fuel to the pressure pump, a centrifugal regulator for controlling the output pressure of the feed pump, a piston responsive to the output pressure of the feed pump for effecting a control over the pressure pump, hydraulic damping means comprising a variable capacity reservoir operative to reduce the magnitude of the fluctuations in the pressure applied to the piston, and a restrictor interposed between the reservoir and a cylinder containing said piston.

2. A liquid fuel pumping apparatus comprising in combination, a pressure pump from which liquid fuel is expelled during an injection stroke and to which liquid fuel is supplied during a filling stroke, a feed pump, a centrifugal regulator for controlling the output pressure of the feed pump, a piston responsive to the output pressure of the feed pump, a variable capacity reservoir, a restrictor through which the reservoir is in communication with the output of the feed pump, said restrictor being constituted by a variable orifice of the centrifugal regulator and including a relief valve which permits fuel to flow to a drain from downstream of the centrifugal regulator, said relief valve being biased by a plunger responsive to the pressure upstream of the centrifugal regulator, the area of the relief valve exposed to the pressure downstream of the centrifugal regulator being larger than that of the plunger, and passage means through which fuel from the reservoir is supplied to the pressure pump during the filling periods thereof.

3. A liquid fuel pumping apparatus comprising in combination, a pressure pump from which liquid fuel is expelled during an injection stroke and to which liquid fuel is supplied during a filling stroke, a feed pump, a pressure responsive piston contained within a cylinder for effecting a control over the pressure pump, a restrictor through which said cylinder is in communication with the outlet of the feed pump, a centrifugal regulator for controlling the magnitude of the pressure intermediate said cylinder and said restrictor, a variable capacity reservoir in direct communication with the outlet of the feed pump, and passage means through which fuel from the reservoir is supplied to the pressure pump during the filling periods thereof.

4. A liquid fuel pumping apparatus as claimed in claim 3 in which the volume of fuel delivered to an outlet of the apparatus is controlled by spilling a portion of the fuel actually pumped by the pressure pump, the spilled fuel being returned to the reservoir.

5. A liquid fuel pumping apparatus comprising in combination, a pressure pump from which liquid fuel is expelled during an injection stroke and to which liquid fuel is supplied during a filling stroke, a feed pump for supplying fuel to the pressure pump, a throttle valve including a piston for controlling the quantity of fuel supplied to the pressure pump from the feed pump, said piston being contained within a cylinder to which fuel is supplied by way of a restrictor, a centrifugal regulator for controlling the pressure downstream of said restrictor, a variable capacity reservoir connected upstream of said restrictor, and a relief valve for spilling surplus fuel delivered by the feed pump.

6. An apparatus as claimed in claim 5 including a further restrictor disposed intermediate the reservoir and the outlet of the feed pump.

References Cited

UNITED STATES PATENTS

| | | | |
|---|---|---|---|
| 3,289,590 | 12/1966 | Hutcheon | 103—2 |
| 2,474,512 | 6/1949 | Bechtold | 230—236 |
| 3,266,424 | 8/1966 | Bunting | 103—5 X |
| 3,292,546 | 12/1966 | Evans. | |
| 3,309,995 | 3/1967 | Tyler | 103—5 X |
| 3,331,327 | 7/1967 | Roosa | 103—2 X |
| 3,356,031 | 12/1967 | Glikin. | |
| 3,358,662 | 12/1967 | Kulke | 103—2 X |

DONLEY J. STOCKING, Primary Examiner

W. J. KRAUSS, Assistant Examiner

U.S. Cl. X.R.

103—223